United States Patent [19]
Herold

[11] 3,917,091
[45] Nov. 4, 1975

[54] METHOD OF SELECTIVELY DISTRIBUTING BULK MATERIAL

[75] Inventor: Robert R. Herold, Fort Worth, Tex.

[73] Assignee: Thomas Conveyor Company, Inc., Fort Worth, Tex.

[22] Filed: Aug. 26, 1974

[21] Appl. No.: 500,695

Related U.S. Application Data

[62] Division of Ser. No. 358,131, May 7, 1973, Pat. No. 3,842,992.

[52] U.S. Cl. .............................................. 214/152
[51] Int. Cl.² ....................................... B65G 65/32
[58] Field of Search . 214/16 R, 17 R, 17 C, 17 CA, 214/152; 222/41, 42, 481, 482, 502; 137/554; 193/31

[56] References Cited
UNITED STATES PATENTS

| | | | |
|---|---|---|---|
| 2,408,397 | 10/1946 | Johnson | 222/482 X |
| 2,437,302 | 3/1948 | Maxon | 214/17 R X |
| 2,839,171 | 6/1958 | Ponto | 193/23 |
| 3,202,978 | 8/1965 | Lewis | 137/554 X |
| 3,314,557 | 4/1967 | Sackett | 214/16 R |

*Primary Examiner*—Robert G. Sheridan
*Attorney, Agent, or Firm*—C. Clark Dougherty, Jr.

[57] ABSTRACT

The present invention relates to a method of selectively distributing bulk materials to one or more desired locations. The method is carried out in apparatus which includes an enclosure adapted to be installed over inlets in a multiple compartment storage bin which lead to the various compartments therein or the enclosure can be connected to a plurality of ducts or chutes leading to individual storage bins or other locations. A first partition is disposed within the enclosure separating it into upper and lower sections, and second partition means are provided within the lower section of the enclosure dividing it into a plurality of separate passageways. A plurality of doors are disposed in the first partition positioned so that each of the doors communicates with one of the passageways in the lower section of the enclosure which in turn communicates with an inlet in a storage bin or with a duct. When the doors are opened, particulated material is caused to flow by gravity from the upper section of the enclosure, through the doors, and out of the enclosure by way of the passageways, and means are provided for selectively opening and closing each of the doors.

2 Claims, 7 Drawing Figures

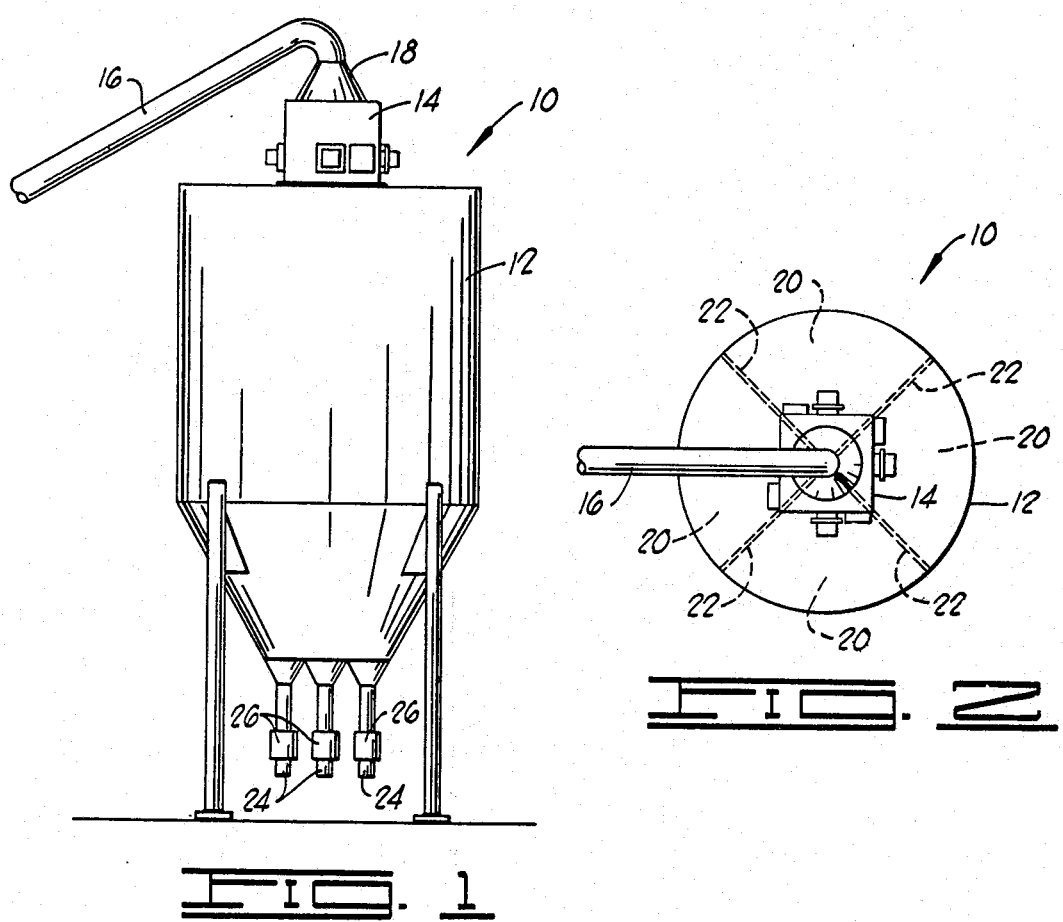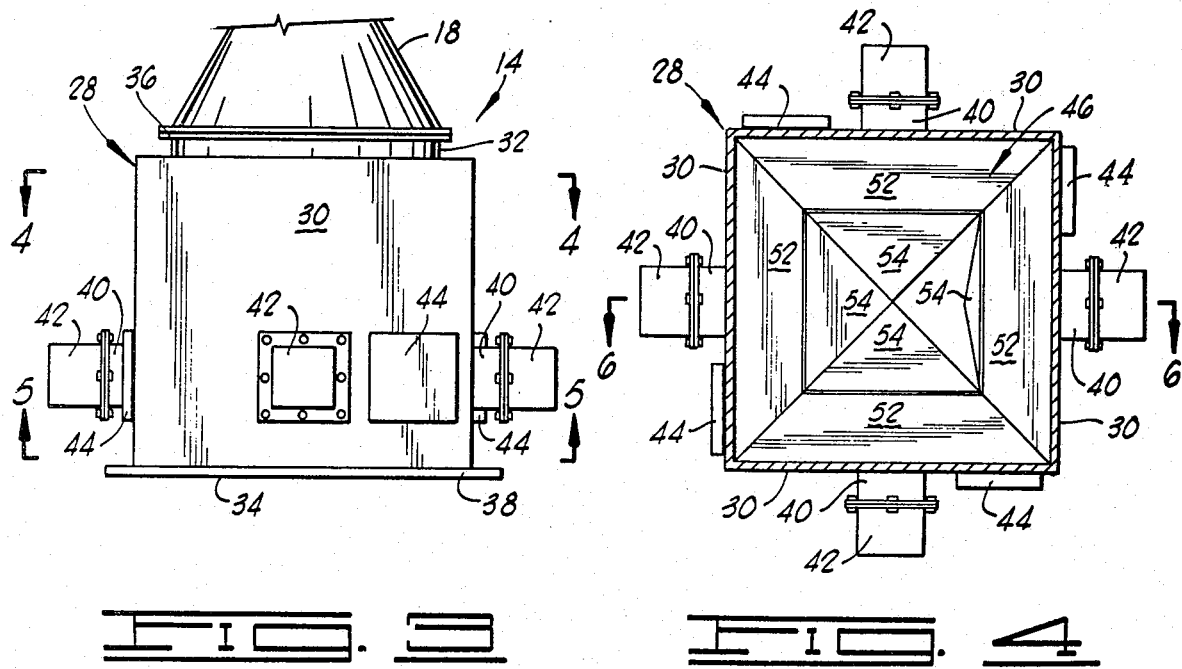

METHOD OF SELECTIVELY DISTRIBUTING BULK

This is a Division of application Ser. No. 358,131 filed May 7, 1973, now U.S. Pat. No. 3,842,992.

BACKGROUND OF THE INVENTION

1. Field of the Invention

The present invention relates generally to a method of distributing bulk material, and more particularly, but not by way of limitation, to a method of selectively distributing particulated bulk material to one or more desired locations wherein the material is caused to flow by gravity through the distributor apparatus.

2. Description of the Prior Art

Multiple compartment storage bins are utilized in industry in a variety of applications. Such bins are generally cylindrical, square or rectangular in shape and include one or more vertical partitions which divide the interiors of the bins into two, three, four, five, six, eight or 10 separate compartments. Each compartment may be used to store a different particulated or pulverulent material, or the same material of different grades. For example, in the rubber industry various bulk materials such as carbon black of different grades are utilized and commonly stored in multiple compartment storage bins.

A variety of methods and apparatus have heretofore been developed and used for distributing bulk particulated materials to desired multiple locations, such as to a plurality of storage bins or compartments in storage bins. The most common of such apparatus includes a hopper for receiving the particulated material from a conveyor or the like and a rotatable spout connected to the hopper. When used to distribute material into a multiple compartment storage bin, the rotary spout apparatus is positioned on top of the bin at a central point thereon so that the spout can be selectively positioned over inlets to each of the compartments. While these rotary spout distributor apparatus can be used to distribute material into the various compartments of the bin, contamination of the stored materials readily occurs. That is, where different kinds or qualities of bulk materials are stored in the various compartments of a single bin, when material is distributed into one compartment quantities thereof enter other of the compartments due to back-venting or cross-venting, i.e., the flow of small amounts of the material into adjacent compartment inlets. Further, when a material is being distributed into one compartment by a rotary spout distributor, the air displaced from that compartment often contains entrained particles of the material which settle out in other compartments by way of the open inlets thereto. In addition, rotary spout distributor apparatus often do not accurately position over the inlet connections in the bin through which material is distributed causing contamination of material and material losses. Such inaccurate positioning of the spout can be caused by a variety of factors such as non-level placement of the distributor and/or bin, etc.

By the present invention, a method and apparatus for distributing material to desired locations, such as into the compartments of a multiple compartment storage bin is provided which overcomes the various problems mentioned above and readily lends itself to fail-safe operation.

SUMMARY OF THE INVENTION

The present invention is directed to a method of selectively distributing particulated material to a plurality of separate locations. The bulk material is conveyed into a distributor which includes a bulk material receiving section having a plurality of doors disposed therein, each of said doors being sealingly communicated with a separate passageway connected to said separate locations so that when said doors are open, bulk material flows by gravity from said receiving section of said distributor to said locations. One or more selected doors in said distributor are opened so that said bulk material flows by gravity to locations where it is desired to distribute said material while the remaining doors are maintained in a closed position.

It is, therefore, an object of the present invention to provide an improved method of selectively distributing material to a plurality of desired locations.

A further object of the present invention is the provision of a method of distributing particulated material into a multiple compartment storage bin wherein contamination of the materials stored in the various compartments of the bin is prevented.

Another object of the present invention is the provision of a method of selectively distributing bulk materials into the compartments of a multiple compartment storage bin or to other desired locations which readily lends itself to automatic and fail-safe operation.

Other and further objects, features and advantages of the invention will be readily apparent to those skilled in the art from a reading of the description of presently preferred embodiments of the invention which follow when taken in conjunction with the accompanying drawings.

BRIEF DESCRIPTION OF THE DRAWINGS

FIG. 1 is a side elevational view of a multiple compartment storage bin having distributor apparatus for carrying out the method of the present invention installed thereon, FIG. 2 is a top view of the storage bin and apparatus of FIG. 1, FIG. 3 is a side elevational view of the distributor apparatus of FIG. 1, FIG. 4 is a cross-sectional view taken along line 4—4 of FIG. 3.

DESCRIPTION OF PREFERRED EMBODIMENTS

Figure 5:
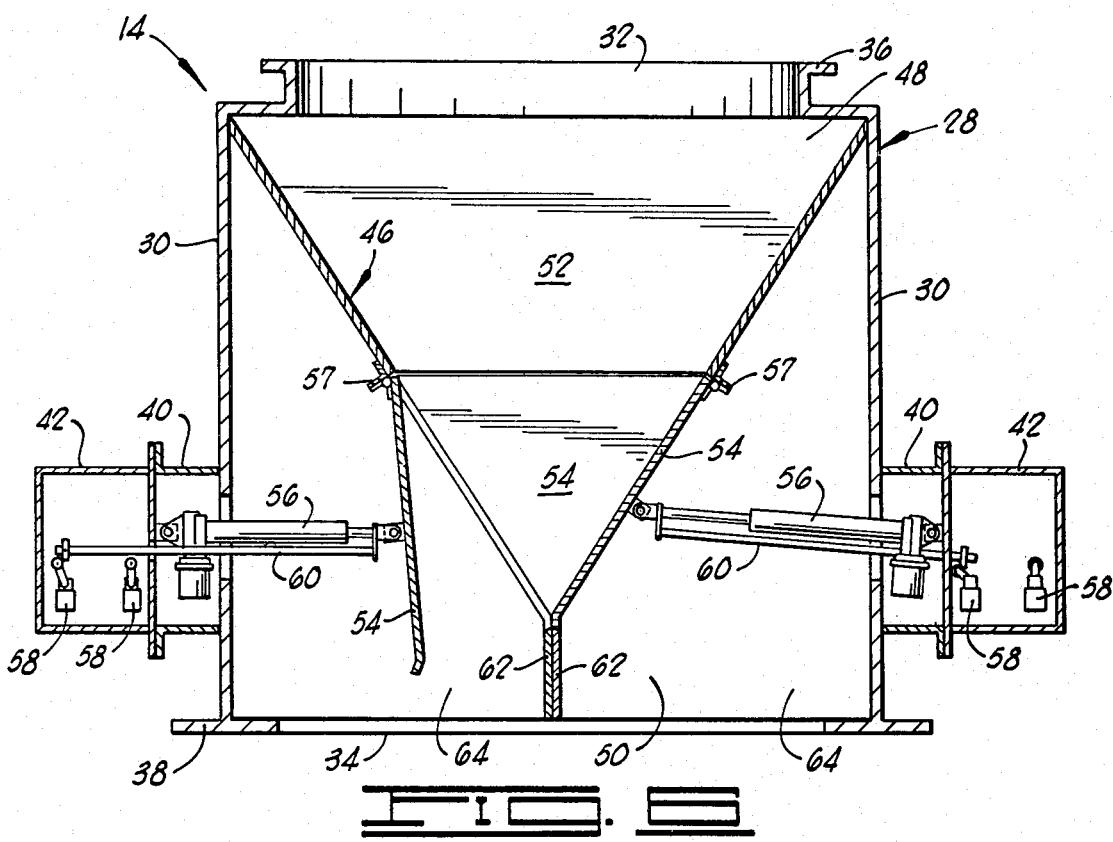
FIG. 5 is a cross-sectional view taken along line 5—5 of FIG. 3.

Referring now to the drawings, and particularly to FIG. 1, a storage system generally designated by the numeral 10 which includes a multiple compartment storage bin 12, distributor apparatus for carrying out the method of the present invention 14, and a conventional particulated material conveyor 16 is illustrated. The conveyor 16, which may be any of a variety of conventional self-cleaning closed particulated material conveyors, is connected to the top of the distributor apparatus 14 by a duct 18. As best shown in FIG. 2, the multiple compartment storage bin 12 is divided into a plurality of separate compartments 20 by vertical partitions 22. For purposes of this disclosure, the bin 12 is shown having four separate compartments 20 therein. However, as will be understood by those skilled in the art, the bin 12 can include fewer or more compartments depending upon the quantity and number of different materials to be stored.

The top of the bin 12 is closed except for the area thereof immediately beneath the distributor apparatus 14 which is open, i.e., inlet openings into each of the compartments 20 are provided. As illustrated in FIG. 1, a separate outlet 24 having a shutoff device 26 disposed therein is usually provided connected to each of the compartments 20 of the bin 12.

Referring now to FIGS. 3 through 6, the distributor apparatus 14 of the present invention is illustrated in detail. Referring particularly to FIG. 3, the apparatus 14 includes an enclosure 28 having four rectangular sides 30, an open top 32 and an open bottom 34. The top 32 preferably includes a large diameter flanged opening 36 for providing sealed engagement with the duct 18 and for receiving particulated material conveyed by the conveyor 16 to the duct 18 and the distributor apparatus 14. The open bottom 34 of the apparatus 14 preferably includes a rectangular flange 38 so that the apparatus 14 can be conveniently bolted or otherwise attached to the top of the multiple compartment bin 12. However, as will be described further hereinbelow, the bottom of the enclosure 28 may be adapted to be connected to a plurality of ducts or chutes if desired. Each of the sides 30 of the apparatus 14 includes a flanged opening 40 having an enclosure 42 bolted thereto and a covered access hole 44.

Figures 6, 7:
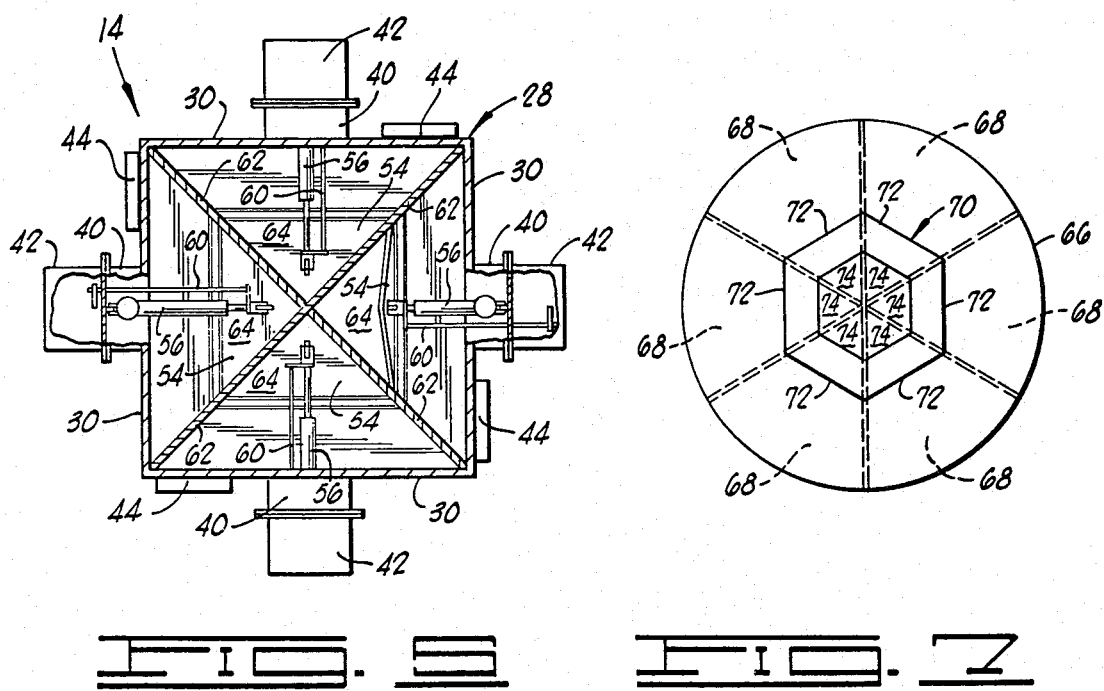
FIG. 6 is a cross-sectional view taken along line 6—6 of FIG. 4.
FIG. 7 is a partially diagrammatic view of a multiple compartment storage bin having an alternate form of distributor apparatus for carrying out the method of the present invention attached thereto.

As best shown in FIGS. 4 and 6, the enclosure 28 of the apparatus 14 includes a first partition generally designated by the numeral 46 disposed therein which divides the internal portion of the enclosure 28 into an upper section 48 and a lower section 50. Preferably, the partition 46 is formed in the shape of an inverted polyhedron having flat faces 52. Each of the faces 52 includes a hinged door 54 which is an integral part of the face 52 at the lower portion thereof.

More specifically, the upper approximately two-thirds portion of each of the faces 52 of the partition 46 are rigidly connected together and to the enclosure 28 such as by welding. The lower triangular portions 54 of the faces 52 are connected to the upper portions by means of hinges 57 thereby forming the doors 54. As will be understood, the doors 54 are of a size such that when all of the doors 54 are closed the upper section 48 within the enclosure 28 is sealed and isolated from the lower section 50 thereof.

As best shown in FIGS. 5 and 6, each of the doors 54 is connected to a conventional operator 56 which is in turn connected to the enclosure 28. The operators 56 may be any conventional electric, hydraulic or pneumatic operators which can be remotely controlled to open and close the doors 54. The operators 56 are preferably electric motor actuated and are connected to the flange portion of the enclosures 42 at the outer ends thereof as illustrated in FIGS. 5 and 6. The access holes 44 as well as the flange connections 40 disposed in each of the sides 30 of the apparatus 14 provide access to the operators 56 for maintenance, etc.

The enclosures 42 each contain a pair of conventional toggle switches 58 (FIG. 6) which are actuated by arm members 60. As best shown in FIG. 5, the arm members 60 are attached to the doors 54 and slidably disposed through the flange portions of the enclosures 42 so that as the doors 54 reach a closed position the arm members 60 actuate the toggle of the innermost switch 58, and when the doors 54 are fully opened the outwardly positioned switch 58 is actuated. As will be understood by those skilled in the art, a variety of different types of switches and switch actuators can be used to indicate the open or closed position of the doors 54.

The switches 58 and door operators 56 are connected by appropriate circuitry to a central control panel (not shown) so that the open or closed position of each of the doors 54 is continuously indicated and positive, accurate and automatic control of the doors 54 is achieved.

Referring now particularly to FIG. 5, partitions 62 are provided in the lower section 50 of the enclosure 28 so that a separate passageway 64 is formed beneath each of the doors 54. The partitions 62 are arranged so that the passageways 64 are sealed and material is prevented from communicating from one passageway 64 to another. As shown best in FIG. 2, the apparatus 14 is positioned on top of the multiple compartment bin 12 in a manner such that the partitions 62 lie adjacent and coincide with the vertical partitions 22 of the bin 12. Further, the apparatus 14 is secured to the top of the bin 12 in a manner such that a sealed fit is achieved between the partitions 62 of the apparatus 14 and the partitions 22 of the bin 12 thereby preventing contamination between bins from occuring.

The distributor apparatus of the present invention preferably includes a first partition 46 formed in the shape of an inverted polyhedron which has a number of faces with doors formed therein equal to the number of compartmtnets in the multiple compartment bin on which the apparatus is to be used or equal to the number of separate locations to which material is to be distributed. Further, while the shape of the enclosure of the distributor apparatus may be of cylindrical or other shape, when used to distribute material to a multiple compartment storage bin, it preferably includes a number of sides equal to the number of compartments in the bin. As will be understood, the inverted polyhedron shape of the partition 46 facilitates and promotes the gravity flow of bulk material through the doors therein and into the bin.

A multiple compartment storage bin 66 is illustrated in FIG. 7 having six compartments 68 formed therein and with a distributor apparatus of the present invention 70 positioned thereon. As shown diagrammatically in FIG. 7, the distributor apparatus 70 includes six sides 72 and six doors 74 coinciding with the six compartments 68 of the bin 66. Further, the first partition which divides the apparatus 70 into upper and lower sections is formed in the shape of an inverted hexahedron.

If the distributor apparatus of the present invention is to be used to distribute material to a plurality of separate locations such as separate storage bins, etc., the bottom of the enclosure of the apparatus is adapted to be connected to separate ducts. That is, referring to FIG. 6, the bottom 34 of the enclosure 28 of the apparatus 14 would be connected to four separate ducts each communicating with a separate passageway 64 thereof.

Operation

In operation of the distributor apparatus 14 of the present invention, bulk material is conveyed by the conveyor 16 (FIG. 1) through the duct 18 into the upper section 48 of the distributor 14. Depending upon which of the compartments 20 of the bin 12 it is desired to distribute material into, one of the doors 54 in the partition 46 is opened by actuating the appropriate operator 56 while the remaining doors are maintained in the closed position. The particulated material conveyed into the upper section 48 of the enclosure 28 flows by gravity through the open door 54 into the corresponding passageway 64 formed in the lower section 50 of the enclosure 28 and then into the bin 12. Because each of the passageways 64 is separated by the partitions 62 and the partitions 62 are sealed against the partitions 22 of the bin 12, communication between compartments is prevented and material is distributed only into the particular compartment desired. Once the distribution of material into the selected compartment has been completed, the door 54 is closed. A different material can then be distributed into another compartment of the bin 12 by opening the appropriate door 54 of the apparatus 14 and repeating the procedure described above.

A particular advantage of the distributor apparatus of the present invention as compared to prior art distributor apparatus is the capability of distributing material into any one, two or all of the compartments of a multiple compartment storage bin simultaneously. That is, one or more of the doors in the distributor apparatus can be open while material is conveyed thereto so that material is distributed into one or more compartments simultaneously.

The present invention, therefore, is well suited to achieve the objects and advantages mentioned as well as those inherent therein. While presently preferred embodiments of the distributor apparatus of the invention have been described for purposes of this disclosure, numerous changes in the details of construction and arrangement of parts can be made which will readily suggest themselves to those skilled in the art and which are encompassed within the spirit of the invention and the scope of the appended claims.

What is claimed is:

1. A method of selectively distributing bulk material to one or more separate locations comprising the steps of:

conveying bulk material into a distributor which includes a bulk material receiving section having a plurality of doors disclosed therein, each of said doors being sealingly communicated with a separate passageway sealingly connected to said separate locations so that when said doors are open bulk material flows by gravity from said receiving section of said distributor to said locations;

opening one or more selected doors in said distributor so that said bulk material flows by gravity to locations where it is desired to distribute the material while maintaining the remaining doors in a closed position; and continuously indicating which of said doors are open and which are closed.

2. A method of selectively distributing bulk material into one or more compartments of a multiple compartment storage bin comprising the steps of:

conveying bulk material into a distributor connected to said bin, said distributor including a bulk material receiving section having a plurality of doors disposed therein, each of said doors being communicated with a separate passageway sealingly connected to separate compartments in said bin so that when said doors are open bulk material flows by gravity from said receiving section of said distributor into said bin;

opening one or more selected doors in said distributor so that said bulk material flows by gravity into the compartments of said bin to which it is desired to distribute material while maintaining the remaining doors in a closed position; and continuously indicating which of said doors are open and which are closed.

* * * * *